United States Patent
Hishinuma

(10) Patent No.: US 8,385,013 B2
(45) Date of Patent: Feb. 26, 2013

(54) OPTICAL MODULE, METHOD FOR PRODUCTION THEREOF, AND IMAGING APPARATUS

(75) Inventor: Yoshikazu Hishinuma, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 12/721,191

(22) Filed: Mar. 10, 2010

(65) Prior Publication Data

US 2010/0232043 A1    Sep. 16, 2010

(30) Foreign Application Priority Data

Mar. 11, 2009    (JP) ................................ 2009-057289

(51) Int. Cl.
G02B 7/02    (2006.01)
(52) U.S. Cl. ......... 359/824; 359/819; 359/822; 359/823
(58) Field of Classification Search .................. 359/819, 359/822, 823, 824
See application file for complete search history.

(56) References Cited

U.S. PATENT DOCUMENTS

| | | | |
|---|---|---|---|
| 7,658,872 B2 | 2/2010 | Kurth | |
| 2002/0071190 A1* | 6/2002 | Wada et al. | 359/819 |
| 2003/0202261 A1* | 10/2003 | Ohtaka | 359/824 |
| 2006/0113701 A1 | 6/2006 | Rudmann et al. | |
| 2006/0170766 A1 | 8/2006 | Kim et al. | |
| 2008/0225419 A1 | 9/2008 | Kim et al. | |
| 2008/0297922 A1* | 12/2008 | Lule | 359/824 |
| 2009/0323151 A1* | 12/2009 | Tani et al. | 359/221.2 |
| 2010/0183760 A1 | 7/2010 | Rudmann et al. | |
| 2011/0032409 A1* | 2/2011 | Rossi et al. | 348/340 |

FOREIGN PATENT DOCUMENTS

| | | |
|---|---|---|
| JP | 2006-184565 A | 7/2006 |
| JP | 2006-209136 A | 8/2006 |
| JP | 2006-519711 A | 8/2006 |
| JP | 2007-149143 A | 6/2007 |

\* cited by examiner

*Primary Examiner* — Ricky Mack
*Assistant Examiner* — Mahidere Sahle
(74) *Attorney, Agent, or Firm* — Birch, Stewart, Kolasch & Birch, LLP

(57) ABSTRACT

An optical module includes a substrate, an optical element directly built in a predetermined area of the substrate, and a piezoelectric element directly formed on the substrate along the circumference of the optical element. The piezoelectric element drives the optical element, by displacing the predetermined area of the substrate, in such a manner to displace the optical element in the direction of the optical axis of the optical element or to incline the optical axis of the optical element.

13 Claims, 4 Drawing Sheets

OPTICAL MODULE, METHOD FOR PRODUCTION THEREOF, AND IMAGING APPARATUS

BACKGROUND OF THE INVENTION

1. Field of the Invention

The present invention relates to an optical module including an optical element and an actuator, and a method for producing the optical module by using MEMS (Micro Electro-Mechanical System) fabrication techniques. Further, the present invention relates to an imaging apparatus including the optical module.

2. Description of the Related Art

In recent years, mobile phones with built-in digital camera functions, which can photograph and directly send photographs by attaching them to e-mails, were sold. Most of the camera functions of the mobile phones use small imaging apparatuses similar to imaging apparatuses of digital cameras. The imaging apparatus used in the mobile phone includes a solid-state imaging sensor, such as a CMOS sensor and a CCD sensor, a lens, a filter and a diaphragm member, which are integrated in one case.

When mass-production and cost reduction of such small imaging apparatuses progress, there is a high possibility that the application field of the small imaging apparatuses sharply expands. Application of the small imaging apparatuses to automobiles, home security systems, game machines, capsule endoscopes, and the like is expected.

In an imaging apparatus, a distance between an imaging sensor and a lens is important as a focal length, and it is necessary to maintain the distance at a predetermined distance. In an ordinary digital camera, an expansion/contraction means for adjusting the focal length is provided in the mechanism structure of the camera. However, since the optical module of the mobile phone is small, it is difficult to provide a complicated expansion/contraction means for the camera function, which is a supplementary function of the mobile phone.

Therefore, the small imaging apparatus generally adopts an optical module that drives a lens holder by using a piezoelectric element as an actuator. For example, Japanese Unexamined Patent Publication No. 2006-184565 discloses an optical module that is assembled by combining elements, such as a piezoelectric element and a lens holder, and an imaging apparatus including the optical module.

However, in the optical module as disclosed in Japanese Unexamined Patent Publication No. 2006-184565, which is assembled by combining parts, the assembly operation is complicated, and a problem in the production cost is not solved.

In recent years, in production of a device including a sensor, an actuator and an electronic circuit that is integrated onto a single silicon substrate, a single glass substrate, a single organic-material substrate or the like, production of the device by using MEMS (Micro Electro Mechanical Systems) fabrication technique was attempted. If the MEMS fabrication technique is used, there is a possibility that the cost for producing the optical module and the size of the optical module are reduced.

SUMMARY OF THE INVENTION

In view of the foregoing circumstances, it is an object of the present invention to provide an optical module that can be produced by using MEMS fabrication technique and a method for producing the optical module. Further, it is another object of the present invention to provide an imaging apparatus including the optical module.

An optical module of the present invention is an optical module comprising:

a substrate;

an optical element directly built in a predetermined area of the substrate; and a piezoelectric element directly formed on the substrate along the circumference (periphery) of the optical element, wherein the piezoelectric element drives the optical element, by displacing the predetermined area of the substrate, in such a manner to displace the optical element in the direction of the optical axis of the optical element or to incline the optical axis of the optical element.

Here, the phrase "directly built in" and the phrase "directly formed" are used to exclude structure in which a separately produced optical element or piezoelectric element is integrated with the substrate, for example, by arranging the element on the substrate and by attaching the element to the substrate or the like. Therefore, an optical module, for example, as disclosed in Japanese Unexamined Patent Publication No. 2006-184565, is not in the scope of the present invention. In Japanese Unexamined Patent Publication No. 2006-184565, each element, such as an optical element and a piezoelectric element, is separately produced, and the optical module is structured by assembling the separate elements onto the substrate.

The piezoelectric element may include a lower electrode layer formed on the substrate, a piezoelectric thin-film formed on the lower electrode layer, and an upper electrode layer formed on the piezoelectric thin-film by patterning. Further, the upper electrode layer may be formed, by patterning, in continuous or intermittent (non-continuous) ring form along the circumference of the optical element.

Further, when the substrate has an opening (aperture) having a predetermined depth on the back side of the predetermined area of the substrate, the diameter of the outer circumference of the ring of the upper electrode layer, which is formed in ring form, may be greater than the diameter of the opening.

The optical element may be a lens or a mirror.

When the substrate has the opening and the optical element is a lens, the substrate may include a silicon substrate having an oxidized thin-film on a surface of the silicon substrate. Further, the silicon substrate may have an opening on the back side of the predetermined area thereof, the opening having a depth reaching the oxidized thin-film from the back side of the predetermined area of the substrate. Further, the optical element may be a lens formed by applying, from the front side and the back side of the oxidized thin-film, resin material to the oxidized thin-film at the opening of the silicon substrate.

When the piezoelectric element includes a lower electrode layer formed on the substrate, a piezoelectric thin-film formed on the lower electrode layer, and an upper electrode layer formed on the piezoelectric thin-film by patterning, and the upper electrode layer is formed, by patterning, in continuous or intermittent ring form along the circumference of the optical element, and when the optical element is a mirror formed, by vapor-deposition, in an area on the piezoelectric thin-film corresponding to a central area of the predetermined area, the upper electrode layer may be arranged on the piezoelectric thin-film along the outer circumference of the mirror in such a manner to be spaced from the mirror.

A method for producing an optical module of the present invention is a method for producing an optical module including a lens and a piezoelectric element arranged along the circumference of the lens, which are integrated with a substrate, the method comprising the steps of:

forming a lower electrode layer on a surface of the substrate;

forming a piezoelectric thin-film on the lower electrode layer;

forming an upper electrode layer along the outer circumference of a predetermined area of the piezoelectric thin-film by patterning;

exposing the surface of the substrate by removing the piezoelectric thin-film in the predetermined area and the lower electrode layer under the piezoelectric thin-film in the predetermined area;

forming a part of the substrate into a thin-film by forming an opening in the part of the substrate by removing an area of the substrate, the area including an area of the substrate corresponding to the predetermined area of the piezoelectric thin-film and being larger than the predetermined area and located in the inside of the outer circumference of the upper electrode, from the back side of the substrate by etching; and forming the lens including the part of the substrate and resin members by providing, from the front side and the back side of the part of the substrate, the resin members in such a manner to hold the part of the substrate from both sides of the substrate.

An imaging apparatus of the present invention is an imaging apparatus including an optical module of the present invention. The optical module may include a lens as an optical element.

The optical module of the present invention includes an optical element and a piezoelectric element that are directly built in a substrate, and the piezoelectric element drives the optical element by displacing a predetermined area of the substrate in such a manner to displace the optical element in the direction of the optical axis of the optical element or to incline the optical axis of the optical element. Compared with conventional optical modules in which optical elements and piezoelectric elements that have been produced separately are assembled onto the substrate, the present invention can produce an extremely small optical module. Further, in the present invention, production using MEMS fabrication technique is possible. Therefore, mass-production and reduction in cost are possible.

When the optical module includes a lens as the optical element, the lens can be displaced along the optical axis of the lens, and the optical axis of the lens can be inclined. Therefore, the optical module can be used to realize a focal length adjustment function and a hand-shake correction function of an imaging apparatus, or the like in a desirable manner.

Further, when the optical module includes a mirror as the optical element, the curvature of the mirror can be changed, and the reflection optical axis and the reflection wavefront form of the mirror can be changed.

The imaging apparatus of the present invention includes an optical module of the present invention, which includes a lens as an optical element. Therefore, it is possible to provide a focal length adjustment function in a limited small space without substantially providing an additional element.

DESCRIPTION OF THE PREFERRED EMBODIMENTS

Embodiments of the present invention will be described in detail with reference to drawings.

"Optical Module According to First Embodiment"

Figure 1:
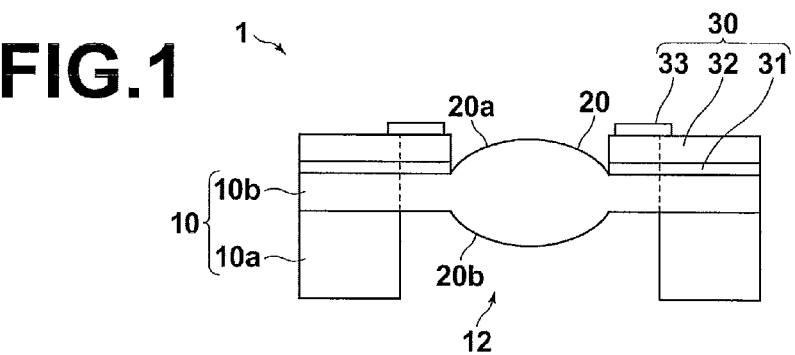
FIG. 1 is a cross-sectional diagram illustrating the structure of an optical module according to a first embodiment of the present invention.
Figure 2:
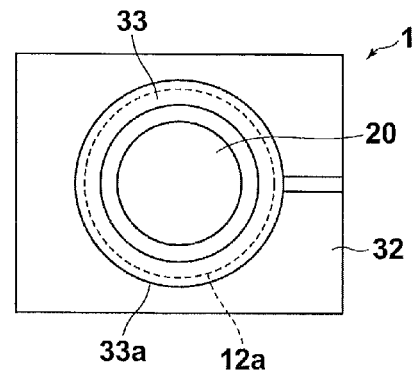
FIG. 2 is a plan view illustrating the structure of the optical module according to the first embodiment.
Figure 3:
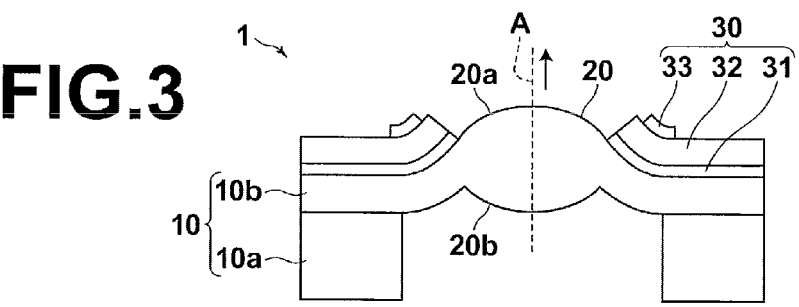
FIG. 3 is a cross-sectional diagram illustrating a drive state of the optical module according to the first embodiment.

With reference to FIGS. 1 and 2, the structure of an optical module according to a first embodiment of the present invention will be described. FIG. 1 is a cross-sectional diagram illustrating an essential part of the optical module. FIG. 2 is a plan view illustrating the essential part of the optical module. FIG. 3 is a cross-sectional diagram illustrating a drive state of the optical module. In FIGS. 1 through 3, elements are illustrated at different scales from actual sizes thereof so that they are easily recognized.

An optical module 1 includes a lens 20, as an optical element, built in a predetermined area of a substrate 10 and a piezoelectric element 30. The piezoelectric element 30 is formed along the circumference (periphery) of the lens 20. The substrate 10 includes an oxidized thin-film 10b on a surface of a silicon substrate 10a. Further, an opening (aperture, hole) 12 is provided on the back side of the predetermined area of the substrate 10. The opening 12 has a depth (predetermined depth) that can keep the oxidized thin-film 10b (without being removed). The lens 20 is formed at the opening 12 in such a manner that the oxidized thin-film 10b (a thin-film part of the substrate 10) is inserted in the lens 20.

The lens 20 is formed by the oxidized thin-film 10b and a UV (ultraviolet ray) curable resin or the like into which the oxidized thin-film 10b is inserted (in other words, the UV curable resin or the like is applied to both sides of the oxidized thin-film 10b). As the UV curable resin, a resin obtained by adding, as a polymerization initiator, Lucirin TPO-L (produced by BASF) to polyethylene glycol 4EG-A, produced by Kyoei Kagaku Kogyo, may be used, for example.

The piezoelectric element 30 includes a lower electrode layer 31, a piezoelectric thin-film 32, and an upper electrode layer 33. The lower electrode layer 31 is formed on a surface of the substrate 10, and the piezoelectric thin-film 32 is deposited on the lower electrode layer 31. The upper electrode layer 33 is formed on the piezoelectric thin-film 32 by patterning. The lower electrode layer 31 and the upper electrode layer 33 apply voltage to the piezoelectric thin-film 32 in the direction of the thickness of the piezoelectric thin-film 32. As illustrated in FIG. 2, the upper electrode layer 33 is formed, by patterning, in continuous ring form along the circumference of the lens 20. The pattern form of the upper electrode layer 33 corresponds to the shape of the piezoelectric element 30. The piezoelectric element 30 drives the lens 20 to displace the lens 20 in the direction of the optical axis of the lens 20. The amount of displacement of the lens 20 can be controlled by changing the magnitude of voltage applied to the piezoelectric element 30.

The piezoelectric thin-film 32 is formed in such a manner that the expansion/contraction direction of the piezoelectric thin-film 32 is in-plane direction thereof. When voltage is applied to the piezoelectric thin-film 32, internal stress of the piezoelectric thin-film 32 acts in such a manner to warp the piezoelectric thin-film 32 upward or downward along the direction of the optical axis of the lens. When voltage is applied to the piezoelectric element 30, in other words, when an electric field is applied to the piezoelectric thin-film 32 by applying voltage between the upper electrode layer 33 and the lower electrode layer 31, the piezoelectric thin-film 32 warps (in FIG. 3, warps upward), as illustrated in FIG. 3. FIG. 3 illustrates a drive state of the optical module 1 according to the present invention. When the piezoelectric thin-film 32 warps, the lens 20 is displaced along optical axis A (toward the upper side in FIG. 3). Whether the piezoelectric thin-film 32 is warped upward or downward, in other words, whether the lens is displaced upward or downward can be controlled by selecting the polarity (positive/negative) of the voltage applied to the piezoelectric thin-film 32. Further, the amount of displacement can be controlled based on the magnitude of the voltage.

The substrate 10 is not limited to the example described above. The substrate 10 may be made of silicon, silicon oxide, stainless steel (SUS (steel use stainless)), yttrium-stabilized zirconia (YSZ), alumina (aluminum oxide), sapphire, SiC, $SrTiO_3$, or the like. The substrate 10 should transmit light at least when the thickness of the substrate 10 is reduced (for example, to approximately 10 μm). The refractive index of the lens should be considered to select the material of the substrate 10.

The composition of the lower electrode layer 31 is not particularly limited. For example, metal or metal oxide, such as Au, Pt, Ir, $IrO_2$, $RuO_2$, $LaNiO_3$, and $SrRuO_3$, or a combination thereof may be used. The composition of the upper electrode layer 33 is not particularly limited. For example, the materials exemplified as the material of the lower electrode layer 31, an electrode material, such as Al, Ta, Cr, and Cu, which are generally used in semiconductor process, or a combination of such materials may be used. Further, the thickness of the lower electrode layer 31 and the thickness of the upper electrode layer 33 are not particularly limited. Optionally, the thicknesses may be in the range of 50 to 500 nm.

A thin-film having a thickness of 10 nm to 100 μm is desirable as the piezoelectric thin-film 32. Optionally, the thickness of the piezoelectric thin-film 32 may be in the range of 100 nm to 20 μm.

The method for forming the piezoelectric thin-film 32 is not particularly limited. For example, the piezoelectric thin-film 32 may be formed by using a gas phase method, such as a sputter method, a plasma CVD (plasma-enhanced chemical vapor deposition) method, an MOCVD (metal organic chemical vapor deposition) method, and a PLD (pulsed laser deposition) method. Alternatively, the piezoelectric thin-film 32 may be formed by using a liquid phase method, such as a sol-gel method and an organic metal decomposition method, an aerosol deposition method, or the like.

The composition of the piezoelectric thin-film 32 is not particularly limited. It is desirable that the piezoelectric thin-film 32 is made of one kind or at least two kinds of perovskite-type oxide represented by the following general formula (P) (inevitable impurities may be contained):

$$ABO_3 \qquad \text{General Formula (P)},$$

(A: A site element, containing at least one kind of element selected from Pb, Ba, Sr, Bi, Li, Na, Ca, Cd, Mg, K, and lanthanide elements, B: B site element, containing at least one kind of element selected from Ti, Zr, V, Nb, Ta, Cr, Mo, W, Mn, Mg, Sc, Co, Cu, In, Sn, Ga, Zn, Cd, Fe, Ni, Hf, and Al, and O: oxygen. The mol ratio of A-site element, B-site element and oxygen element is 1:1:3 in standard. However, the mol ratio may be deviated from the standard mol ratio as long as the material has perovskite structure.)

Examples of the perovskite-type oxide represented by the general formula (P) are as follows:

a lead-containing compound, such as lead titanate, lead zirconate titanate (PZT), lead zirconate, lead lanthanum titanate, lead lanthanum zirconate titanate, lead magnesium-niobate zirconium titanate, lead nickel-niobate zirconium titanate, and lead zinc-niobate zirconium titanate, or a mixed crystal system of these compounds; and a non-lead-containing compound, such as barium titanate, strontium barium titanate, bismuth sodium titanate, bismuth potassium titanate, sodium niobate, potassium niobate, and lithium niobate, or a mixed crystal system of these compounds.

It is desirable that the perovskite-type oxide represented by the general formula (P) contains one kind or at least two kinds of metal ions, such as Mg, Ca, Sr, Ba, Bi, Nb, Ta, W, and Ln (=lanthanide element (La, Ce, Pr, Nd, Sm, Eu, Gd, Tb, Dy, Ho, Er, Tm, Yb, and Lu)), to have more excellent electrical properties.

"Method for Producing Optical Module According to First Embodiment"

An example of a method for producing an optical module according to the first embodiment of the present invention will be described with reference to drawings. FIGS. 4A through 4E are cross-sectional diagrams illustrating the production process of the optical module according to the first embodiment.

First, a silicon substrate 10a is prepared and oxidized by heating for a long time period. Accordingly, a heat-oxidized thin-film 10b (hereinafter referred to as $SiO_2$ thin-film 10b) having a thickness of approximately 10 μm is formed on the surface of the silicon substrate 10a (please refer to FIG. 4A).

Figure 4A:
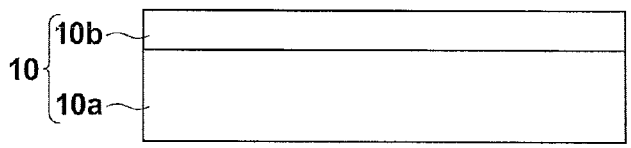
FIG. 4A is a cross-sectional diagram (No. 1) illustrating a production step of the optical module according to the first embodiment.
Figure 4B:
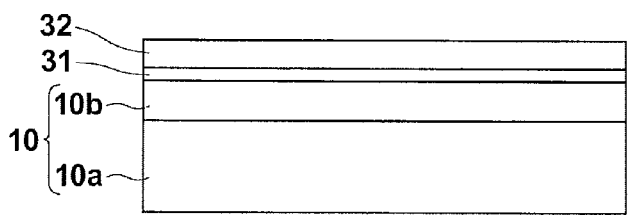
FIG. 4B is a cross-sectional diagram (No. 2) illustrating a production step of the optical module according to the first embodiment.

Further, a lower electrode layer 31 (for example, Ti/Pt) and a piezoelectric thin-film 32 (for example, a PZT thin-film having a thickness of 5 μm) are formed, by sputtering, on the $SiO_2$ thin-film 10b (please refer to FIG. 4B).

Figure 4C:
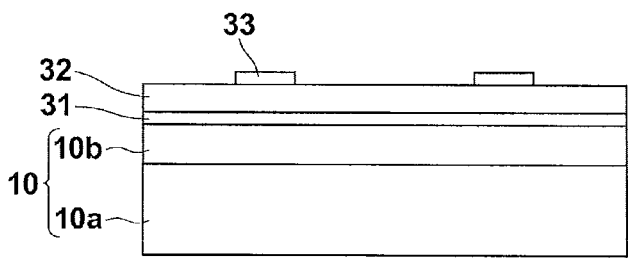
FIG. 4C is a cross-sectional diagram (No. 3) illustrating a production step of the optical module according to the first embodiment.

Next, as illustrated in FIG. 4C, a ring-form upper electrode layer 33 is pattern-formed on the piezoelectric thin-film 32 by lithography and by using a sputter method. The upper electrode layer 33 is formed by applying a resist mask in an area of the piezoelectric thin-film 32, the area in which the upper electrode layer 33 is not to be formed. After the resist mask is applied, the material of the upper electrode 33 is deposited, and the resist mask and the material of the upper electrode layer 33 deposited on the resist mask are removed by a lift-off method to form the upper electrode layer 33.

Figure 4D:
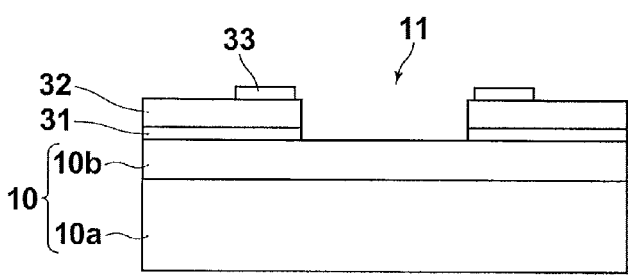
FIG. 4D is a cross-sectional diagram (No. 4) illustrating a production step of the optical module according to the first embodiment.

Next, as illustrated in FIG. 4D, the piezoelectric thin-film 32 and the lower electrode layer 31 in an area (predetermined area) 11 in the inside of the ring-form upper electrode layer 33 are removed by dry etching to expose the surface of the $SiO_2$ thin-film 10b.

Figure 4E:
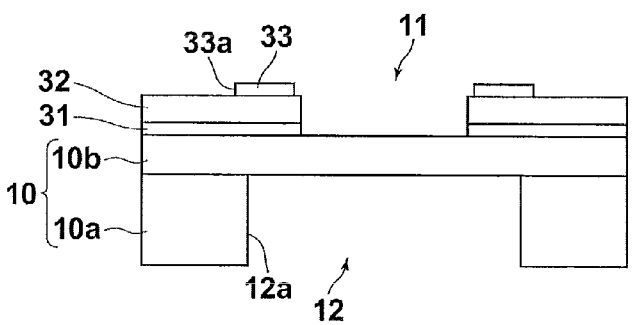
FIG. 4E is a cross-sectional diagram (No. 5) illustrating a production step of the optical module according to the first embodiment.

Further, as illustrated in FIG. 4E, the substrate 10 is removed by etching from a side (back side) of the substrate 10, the back side opposite to the piezoelectric element formed side of the substrate 10. The substrate 10 is removed by using a Bosch method until the back side of the $SiO_2$ thin-film 10b is exposed to form an opening 12. The opening 12 is formed in an area opposite to the predetermined area 11, in which the piezoelectric thin-film 32 and the lower electrode layer 31 have been removed. The opening 12 is formed in such a manner that the outer circumference (periphery) 12a of the opening 12 is greater than or equal to the predetermined area 11 and less than the outer circumference 33a of the ring-form upper electrode layer 33. It is desirable that the outer circumference 12a of the opening 12 is smaller than the outer circumference 33a of the ring-form upper electrode layer 33 to increase the amount of displacement. At the same time, the size of the opening 12 is sufficient if the lens can be formed, and the opening may be formed in an area substantially similar to the predetermined area 11. The diameter of the opening of the predetermined area 11 is approximately in the range of φ 100 μm to 2 mm.

Finally, transparent metallic molds (patterns) are used, and UV-curable type resin 20a, 20b is applied to the upper side and the lower side of the $SiO_2$ thin-film in the predetermined area 11 and the opening 12, in which the upper side and the back side of the $SiO_2$ thin-film are exposed. Further, the UV-curable type resin 20a, 20b is irradiated with UV rays to form the lens 20 (please refer to FIG. 1). As the method for forming the lens, the method disclosed in U.S. Pat. No. 7,658,877 may be adopted.

As described above, it is possible to easily produce the optical module by using the MEMS fabrication technique and the thin-film piezoelectric deposition technique. Further, the method for producing the optical module of the first embodiment is not limited to the aforementioned process, and the method may be appropriately modified.

The optical module of the present embodiment can be formed, for example, by using the production method as described above, and the size of the optical module of the present embodiment is extremely small, for example approximately in 5 mm square. In the aforementioned production method, a plurality of elements are produced simultaneously for each wafer unit, and the plurality of elements are divided into separate pieces at the end. Therefore, mass production of the optical modules and low-cost production of the optical modules become possible.

"Optical Module According to Second Embodiment"

Figure 5:
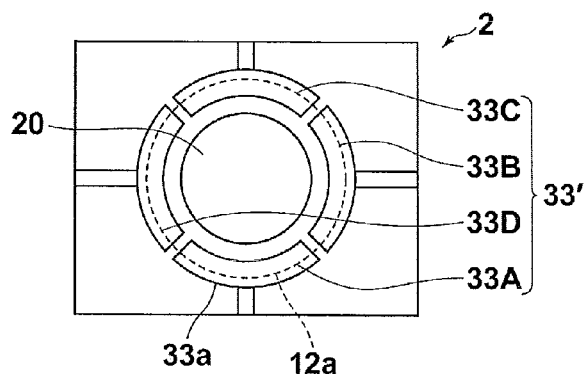
FIG. 5 is a plan view illustrating an essential part of an optical module according to a second embodiment of the present invention.
Figure 6:
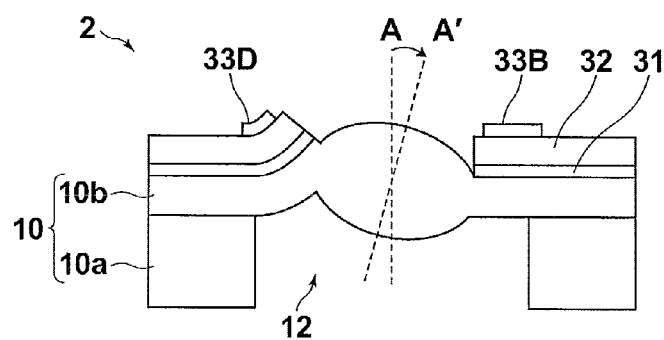
FIG. 6 is a cross-sectional diagram illustrating a drive state of the optical module according to the second embodiment.

An optical module 2 according to the second embodiment will be described. FIG. 5 is a plan view illustrating an essential part of the optical module 2 according to the second embodiment. FIG. 6 is a cross-sectional diagram illustrating a drive state of the optical module 2 according to the second embodiment.

In the optical module 2 of the second embodiment, the shape of the upper electrode layer 33' differs from the shape of the upper electrode layer 33 in the optical module 1 of the first embodiment. However, other elements are similar to those of the first embodiment. In FIGS. 5 and 6, the same reference numerals will be assigned to the same elements as those of the optical module 1 of the first embodiment, and the detailed descriptions thereof will be omitted.

The upper electrode layer 33' in the optical module 2 of the second embodiment is composed of a plurality of electrodes 33A through 33D and has intermittent ring form. The electrodes 33A through 33D can be controlled respectively. For example, as illustrated in FIG. 6, when voltage is applied only to the electrode 33D, optical axis A of the lens can be inclined to direction A'. The optical axis can be inclined to desirable directions by selectively applying voltage to the electrodes 33A through 33D. When the same voltage is applied simultaneously to all of the electrodes 33A through 33D, the lens can be displaced vertically (upward or downward) along the optical axis of the lens in a manner similar to the optical module 1 of the first embodiment.

The optical module 2 of the second embodiment may be produced by using a production method similar to that of the optical module 1 of the first embodiment.

"Optical Module According to Third Embodiment"

Figure 7:
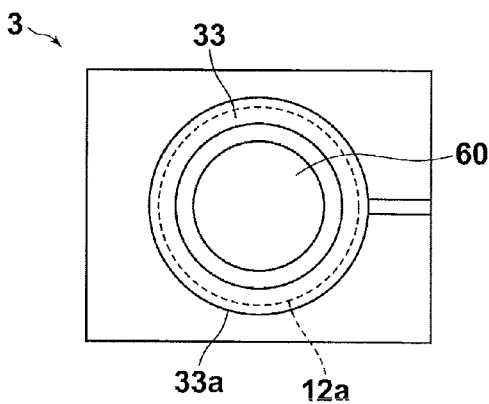
FIG. 7 is a plan view illustrating an essential part of an optical module according to a third embodiment of the present invention.
Figure 8:
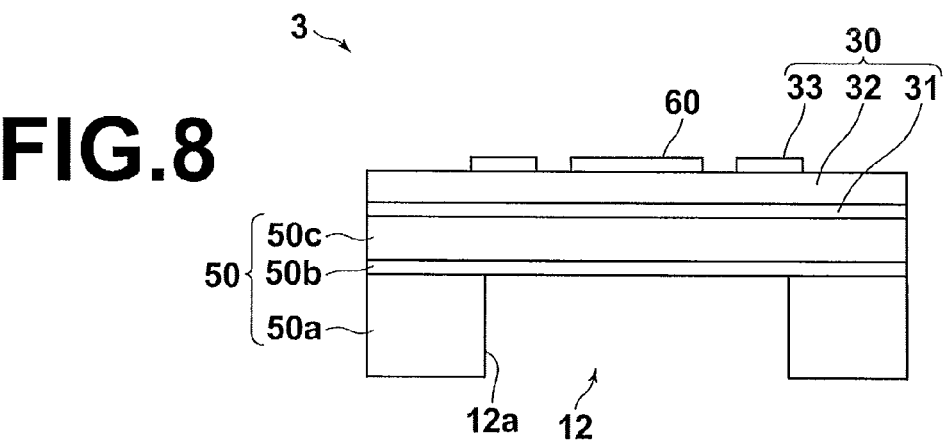
FIG. 8 is a cross-sectional diagram illustrating the essential part of the optical module according to the third embodiment of the present invention.
Figure 9:
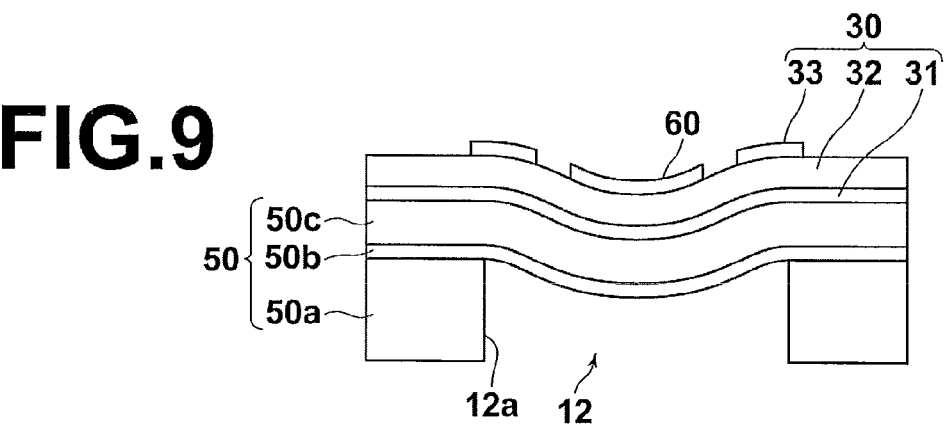
FIG. 9 is a cross-sectional diagram illustrating a drive state of the optical module according to the third embodiment.

An optical module 3 of the third embodiment will be described. FIG. 7 is a plan view illustrating an essential part of the optical module 3 according to the third embodiment. FIG. 8 is a cross sectional diagram illustrating the essential part of the optical module 3. FIG. 9 is a diagram illustrating a drive state of the optical module 3.

The optical module 3 of the present embodiment is a variable curvature mirror device. The optical module 3 includes a mirror 60, as an optical element, and a piezoelectric element 30 formed along the circumference of the mirror 60. The mirror 60 is built in a predetermined area of a substrate 50.

Here, the substrate 50 is a layered substrate (SOI substrate) 50, in which a $SiO_2$ thin-film 50b and a Si active layer 50c are sequentially deposited on a silicon substrate 50a. Further, an opening 12 is provided on the back side of the layered substrate 50, the back side opposite to the mirror-60-formation area (predetermined area). The opening 12 is formed in such a manner to have a depth (predetermined depth) that can keep the $SiO_2$ thin-film 50b and the Si active layer 50c (without being removed).

Piezoelectric element 30 includes a lower electrode layer 31 formed on the surface of the Si active layer 50c of the substrate 50, a piezoelectric thin-film 32, formed on the lower electrode layer 31, and an upper electrode layer 33. The upper electrode 33 is formed by patterning on the piezoelectric thin-film 32. The lower electrode layer 31 and the upper electrode layer 33 apply voltage to the piezoelectric thin-film 32 in the thickness direction of the piezoelectric thin-film 32. As illustrated in FIG. 7, the upper electrode layer 33 is spaced apart from the mirror 60, and formed by patterning in continuous ring form along the circumference of the mirror 60. The pattern form of the upper electrode layer 33 corresponds to the shape of the piezoelectric element 30. The piezoelectric element 30 changes the curvature of the mirror 60, and the amount of change in the curvature may be controlled by the voltage applied to the piezoelectric element 30.

The mirror 60 is formed in a predetermined area on the piezoelectric thin-film 32. A high-reflectance metal material, such as silver and aluminum, is appropriate as the material of the mirror 60. It is desirable that the mirror 60 is made of the same material as the upper electrode layer 33, and formed simultaneously in the process of forming the upper electrode layer 33.

The piezoelectric thin-film 32 of the piezoelectric element 30 is formed in such a manner that the expansion/contraction direction of the piezoelectric thin-film 32 is in an in-plane direction thereof. When voltage is applied to the piezoelectric thin-film 32, an internal stress acts in such a manner that the area of the piezoelectric thin-film 32 in which the mirror 60 is formed projects upward or downward. When voltage is applied to the piezoelectric element 30, in other words, when an electric field is applied to the piezoelectric thin-film 32 by applying voltage between the upper electrode layer 33 and the lower electrode layer 31, the piezoelectric thin-film 32 can be displaced, for example, downward, as illustrated in FIG. 9. FIG. 9 illustrates a drive state of the optical module 3 of the present embodiment.

The variable curvature mirror as described above may be used, for example, as a compensation optical system for correcting the optical wavefront disturbed by fluctuation of atmosphere or the like, and applied to the fields of astronomy, funduscopy, microscope observation, and the like.

When the optical module includes a mirror as an optical element, the upper electrode layer may be composed of a plurality of electrodes in intermittent ring form similar to the optical module of the second embodiment. When voltage is selectively applied to the plurality of electrodes, the optical axis can be inclined in addition to changing the curvature.

The optical module 3 of the third embodiment may be produced by using a production method similar to the production methods of the first and second embodiments. Specifically, the optical module 3 of the third embodiment may be produced by using the MEMS fabrication technique and the thin-film piezoelectric deposition technique.

The optical modules according to the first through third embodiments may be easily formed also in array form. When a lens is provided as the optical element, the optical modules may be applied to movable micro lens array. When a mirror is provided as the optical element, the optical module may be applied to a DMD (digital mirror device) or the like.

"Imaging Apparatus"

Figure 10:
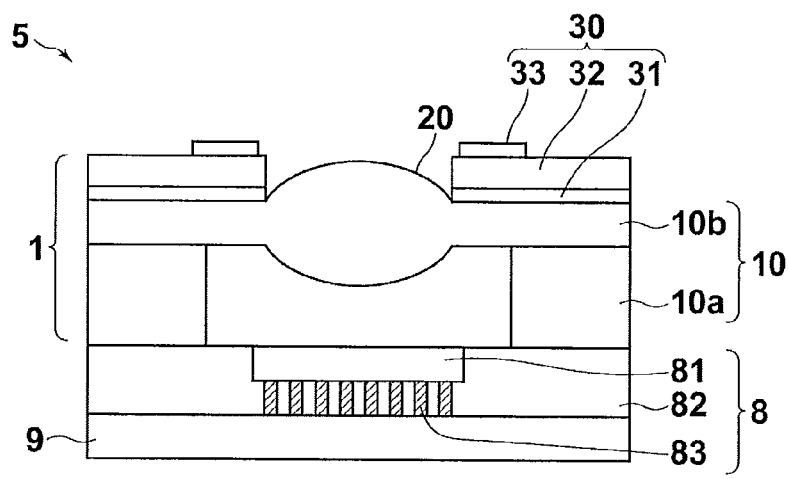
FIG. 10 is a cross-sectional diagram illustrating the structure of an imaging apparatus including an optical module according to the first or second embodiment of the present invention.

An imaging apparatus 5 including the optical module 1 of the first embodiment will be described. FIG. 10 is a schematic diagram illustrating a cross-section of the imaging apparatus 5 of the present embodiment.

The imaging apparatus 5 includes the optical module 1, an imaging sensor unit 8, and a circuit board (substrate) 9. The imaging sensor unit 8 includes a CMOS (complementary metal-oxide semiconductor) sensor 81, as an imaging sensor, and an interposer 82. The CMOS sensor 81 is arranged in such a manner to face the lens 20, and is connected to a circuit on the circuit board 9 through a built-in electrode 83.

The imaging apparatus 5, each having a size of approximately 5 mm square, may be produced by producing each of an optical module wafer, an imaging sensor unit wafer, and a circuit board wafer. These wafers may be positioned and deposited one on another, and attached to each other. Further, the attached wafers may be divided into separate pieces to produce the imaging apparatuses 5 of approximately 5 mm square. The method for producing the optical module wafer is similar to the method for producing the optical module of the first embodiment.

The imaging apparatus 5 includes the optical module 1, and the lens can be displaced in the direction of the optical axis of the lens by driving the piezoelectric element 30 in the optical module 1. Therefore, the imaging apparatus 5 can adjust the focal length. Further, when the optical module 2 of the second embodiment is provided instead of the optical module 1, the optical axis of the lens can also be inclined. Therefore, a hand shake correction function can be provided.

The size of a conventional imaging apparatus mounted in a mobile phone is approximately 1 cm square. The imaging apparatus of the present invention can remarkably reduce the size of the imaging apparatus. Further, the imaging apparatus of the present invention is easily produced, and mass production is possible. The present invention can improve the production yield and reduce the production cost.

What is claimed is:

1. An optical module comprising:
a substrate;
an optical element directly built in a predetermined area of the substrate; and
a piezoelectric element directly formed on the substrate along the circumference of the optical element,
wherein the piezoelectric element drives the optical element, by displacing the predetermined area of the substrate, in such a manner to displace the optical element in the direction of the optical axis of the optical element or to incline the optical axis of the optical element, and includes a lower electrode layer formed on the substrate, a piezoelectric thin-film formed on the lower electrode layer, and an upper electrode layer formed on the piezoelectric thin-film by patterning,
wherein the upper electrode layer is formed, by patterning, in ring form along the circumference of the optical element,
wherein the substrate has an opening having a predetermined depth on the back side of the predetermined area of the substrate, and wherein the diameter of the outer circumference of the ring of the upper electrode layer, which is formed in ring form, is greater than the diameter of the opening.

2. An optical module, as defined in claim 1, wherein the optical element is a lens.

3. An optical module, as defined in claim 1, wherein the substrate includes a silicon substrate having an oxidized thin-film on a surface of the silicon substrate, and wherein the substrate has an opening on the back side of the predetermined area thereof, the opening having a depth reaching the oxidized thin-film from the back side of the predetermined area of the substrate, and wherein the optical element is a lens formed by applying, from the front side and the back side of the oxidized thin-film, resin material to the oxidized thin-film at the opening of the silicon substrate.

4. An optical module, as defined in claim 1, wherein the optical element is a mirror.

5. An optical module, as defined in claim 1, wherein the optical element is a mirror formed, by vapor-deposition, in an area on the piezoelectric thin-film corresponding to a central area of the predetermined area, and wherein the upper electrode layer is arranged on the piezoelectric thin-film along the outer circumference of the mirror in such a manner to be spaced from the mirror.

6. A method for producing an optical module including a lens and a piezoelectric element arranged along the circumference of the lens, which are integrated with a substrate, the method comprising the steps of:
forming a lower electrode layer on a surface of the substrate;
forming a piezoelectric thin-film on the lower electrode layer;

forming an upper electrode layer along the outer circumference of a predetermined area of the piezoelectric thin-film by patterning;

exposing the surface of the substrate by removing the piezoelectric thin-film in the predetermined area and the lower electrode layer under the piezoelectric thin-film in the predetermined area;

forming a part of the substrate into a thin-film by forming an opening in the part of the substrate by removing an area of the substrate, the area including an area of the substrate corresponding to the predetermined area of the piezoelectric thin-film and being larger than the predetermined area and located in the inside of the outer circumference of the upper electrode, from the back side of the substrate by etching; and forming the lens including the part of the substrate and resin members by providing, from the front side and the back side of the part of the substrate, the resin members in such a manner to hold the part of the substrate from both sides of the substrate.

7. An imaging apparatus comprising:

a substrate;

a lens directly built in a predetermined area of the substrate; and a piezoelectric element directly formed on the substrate along the circumference of the lens, wherein the piezoelectric element drives the lens, by displacing the predetermined area of the substrate, in such a manner to displace the lens in the direction of the optical axis of the lens or to incline the optical axis of the lens, and includes a lower electrode layer formed on the substrate, a piezoelectric thin-film formed on the lower electrode layer, and an upper electrode layer formed on the piezoelectric thin-film by patterning, wherein the upper electrode layer is formed, by patterning, in ring form along the circumference of the lens, wherein the substrate has an opening having a predetermined depth on the back side of the predetermined area of the substrate, and wherein the diameter of the outer circumference of the ring of the upper electrode layer, which is formed in ring form, is greater than the diameter of the opening.

8. An optical module comprising:

a substrate;

an optical element directly built in a predetermined area of the substrate; and a piezoelectric element directly formed on the substrate along the circumference of the optical element, wherein the piezoelectric element drives the optical element, by displacing the predetermined area of the substrate, in such a manner to displace the optical element in the direction of the optical axis of the optical element or to incline the optical axis of the optical element, and includes a lower electrode layer formed on the substrate, a piezoelectric thin-film formed on the lower electrode layer, and an upper electrode layer formed on the piezoelectric thin-film by patterning, wherein the upper electrode layer is composed of a plurality of arc-shaped electrodes that are formed, by patterning, in ring form along the circumference of the optical element, wherein the substrate has an opening having a predetermined depth on the back side of the predetermined area of the substrate, and wherein the diameter of the outer circumference of the ring of the upper electrode layer, which is formed in ring form, is greater than the diameter of the opening.

9. An optical module, as defined in claim 8, wherein the optical element is a lens.

10. An optical module, as defined in claim 8, wherein the substrate includes a silicon substrate having an oxidized thin-film on a surface of the silicon substrate, and wherein the substrate has an opening on the back side of the predetermined area thereof, the opening having a depth reaching the oxidized thin-film from the back side of the predetermined area of the substrate, and wherein the optical element is a lens formed by applying, from the front side and the back side of the oxidized thin-film, resin material to the oxidized thin-film at the opening of the silicon substrate.

11. An optical module, as defined in claim 8, wherein the optical element is a mirror.

12. An optical module, as defined in claim 8, wherein the optical element is a mirror formed, by vapor-deposition, in an area on the piezoelectric thin-film corresponding to a central area of the predetermined area, and wherein the upper electrode layer is arranged on the piezoelectric thin-film along the outer circumference of the mirror in such a manner to be spaced from the mirror.

13. An imaging apparatus comprising:

a substrate;

a lens directly built in a predetermined area of the substrate; and a piezoelectric element directly formed on the substrate along the circumference of the lens, wherein the piezoelectric element drives the lens, by displacing the predetermined area of the substrate, in such a manner to displace the lens in the direction of the optical axis of the lens or to incline the optical axis of the lens, and includes a lower electrode layer formed on the substrate, a piezoelectric thin-film formed on the lower electrode layer, and an upper electrode layer formed on the piezoelectric thin-film by patterning, wherein the upper electrode layer is composed of a plurality of arc-shaped electrodes that are formed, by patterning, in ring form along the circumference of the lens, wherein the substrate has an opening having a predetermined depth on the back side of the predetermined area of the substrate, and wherein the diameter of the outer circumference of the ring of the upper electrode layer, which is formed in ring form, is greater than the diameter of the opening.

* * * * *